(12) United States Patent
Chan et al.

(10) Patent No.: US 9,063,620 B2
(45) Date of Patent: Jun. 23, 2015

(54) TOUCH DEVICES AND FABRICATION METHODS THEREOF

(75) Inventors: Chien-Ting Chan, Tainan (TW); Kuo-Sheng Lee, Tainan (TW); Szu-Yu Fang, Tainan (TW); Yuan-Te Chao, Pingtung (TW)

(73) Assignee: HANNSTAR DISPLAY CORP., New Taipei (TW)

( * ) Notice: Subject to any disclaimer, the term of this patent is extended or adjusted under 35 U.S.C. 154(b) by 416 days.

(21) Appl. No.: 13/487,428

(22) Filed: Jun. 4, 2012

(65) Prior Publication Data

US 2013/0153388 A1 Jun. 20, 2013

(30) Foreign Application Priority Data

Dec. 19, 2011 (CN) .......................... 2011 1 0438680

(51) Int. Cl.
  *H01H 13/70* (2006.01)
  *H01H 25/00* (2006.01)
  *H01H 25/04* (2006.01)
  *G06F 3/044* (2006.01)

(52) U.S. Cl.
  CPC ............... *G06F 3/044* (2013.01); *H01H 13/70* (2013.01); *G06F 2203/04103* (2013.01); *G06F 2203/04111* (2013.01)

(58) Field of Classification Search
  CPC ....... H01H 1/00; H01H 13/70; H01H 13/702; H01H 13/703; H01H 13/704; H01H 2239/074; H01H 2203/008; H01H 2207/01; H01H 2221/00; H01H 2231/002; H01H 2231/012; H01H 2231/016; H01H 2231/052; H01H 2239/006
  USPC ..... 200/600, 46, 5 R, 5 A, 292, 243; 345/173
  See application file for complete search history.

(56) References Cited

U.S. PATENT DOCUMENTS

| 8,643,614 B2* | 2/2014 | Wu et al. ........................ 345/173 |
| 8,766,935 B2* | 7/2014 | Matsuo ........................ 345/173 |
| 2012/0235927 A1* | 9/2012 | Ho et al. ........................ 345/173 |

* cited by examiner

*Primary Examiner* — Renee Luebke
*Assistant Examiner* — Anthony R. Jimenez
(74) *Attorney, Agent, or Firm* — Muncy, Geissler, Olds & Lowe, P.C.

(57) ABSTRACT

A touch device and a fabrication method thereof are provided. The touch device includes a cover lens, a first light shielding pattern and a touch sensing element disposed on the cover lens, a passivation layer covering the touch sensing element and the first light shielding pattern, and a second light shielding pattern disposed on the passivation layer, wherein the second light shielding pattern overlaps with a part of the first light shielding pattern.

18 Claims, 5 Drawing Sheets

TOUCH DEVICES AND FABRICATION METHODS THEREOF

CROSS REFERENCE TO RELATED APPLICATIONS

This Application claims priority of the People's Republic of China Patent Application No. 201110438680.1, filed on Dec. 19, 2011, the entirety of which is incorporated by reference herein.

BACKGROUND OF THE INVENTION

1. Field of the Invention

The present invention relates to a touch device, and in particular relates to the design and the fabrication of a light shielding pattern of a touch device.

2. Description of the Related Art

In general, a light shielding pattern is formed at a peripheral area of a touch device to cover a touch sensing element and a conductive trace for connecting with an external circuit of the touch device. In conventional touch devices, the light shielding pattern is formed by an exposure and development process. If the conventional touch device wants to change the light shielding pattern, the mask of forming the light shielding pattern also has to be replaced. Thus, this increases the manufacturing cost of conventional touch devices.

Further, after the fabrication of all elements of the touch devices on a glass substrate is completed, a cutting process is performed on the glass substrate. Then, the edges of the cut glass substrate are etched to eliminate cracks in the edges of the cut glass substrate for enhancing the mechanical strength of the glass substrate. In the conventional touch devices, after cutting the glass substrate, the light shielding pattern aligns with the edges of the glass substrate. When an etching process is performed on the edges of the glass substrate, the light shielding pattern is damaged by the etching process. This causes the light shielding pattern to easily be stripped or damaged, thus, if occurring, the process yield of conventional touch devices would be reduced.

BRIEF SUMMARY OF THE INVENTION

Therefore, the embodiments of the invention provide touch devices and methods of fabricating the touch devices, wherein light shielding patterns are formed by two steps of processes. Firstly, a first light shielding pattern is formed by an exposure and development process. Then, a second light shielding pattern is formed by a printing process. Even for different designs of the light shielding patterns, a mask for forming the first light shielding pattern does not need to be replaced. The different designs of the light shielding patterns can be achieved by the printing process of the second light shielding pattern. Thus, this saves the cost of the mask for fabricating the touch devices of the invention. Moreover, according to the embodiments of the invention, after cutting a substrate of a cover lens, the first light shielding pattern is not located on the edges of the substrate of a cover lens. Thus, this is advantageous for subsequent processes to treat the edges of the substrate. The above mentioned problems of the conventional touch devices are overcome and the process yield of the touch devices is enhanced.

According to an illustrative embodiment, a touch device is provided. The touch device comprises a cover lens. A first light shielding pattern is disposed on the cover lens. A touch sensing element is also disposed on the cover lens. A passivation layer is disposed over the touch sensing element and the first light shielding pattern. A second light shielding pattern is disposed on the passivation layer, wherein the second light shielding pattern overlaps with a portion of the first light shielding pattern.

According to an illustrative embodiment, a method of fabricating a touch device is provided. The method comprises: providing a substrate; forming a first light shielding pattern on the substrate; forming a touch sensing element on the substrate; forming a passivation layer to cover the touch sensing element and the first light shielding pattern; and forming a second light shielding pattern on the passivation layer, wherein the second light shielding pattern overlaps with a portion of the first light shielding pattern.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
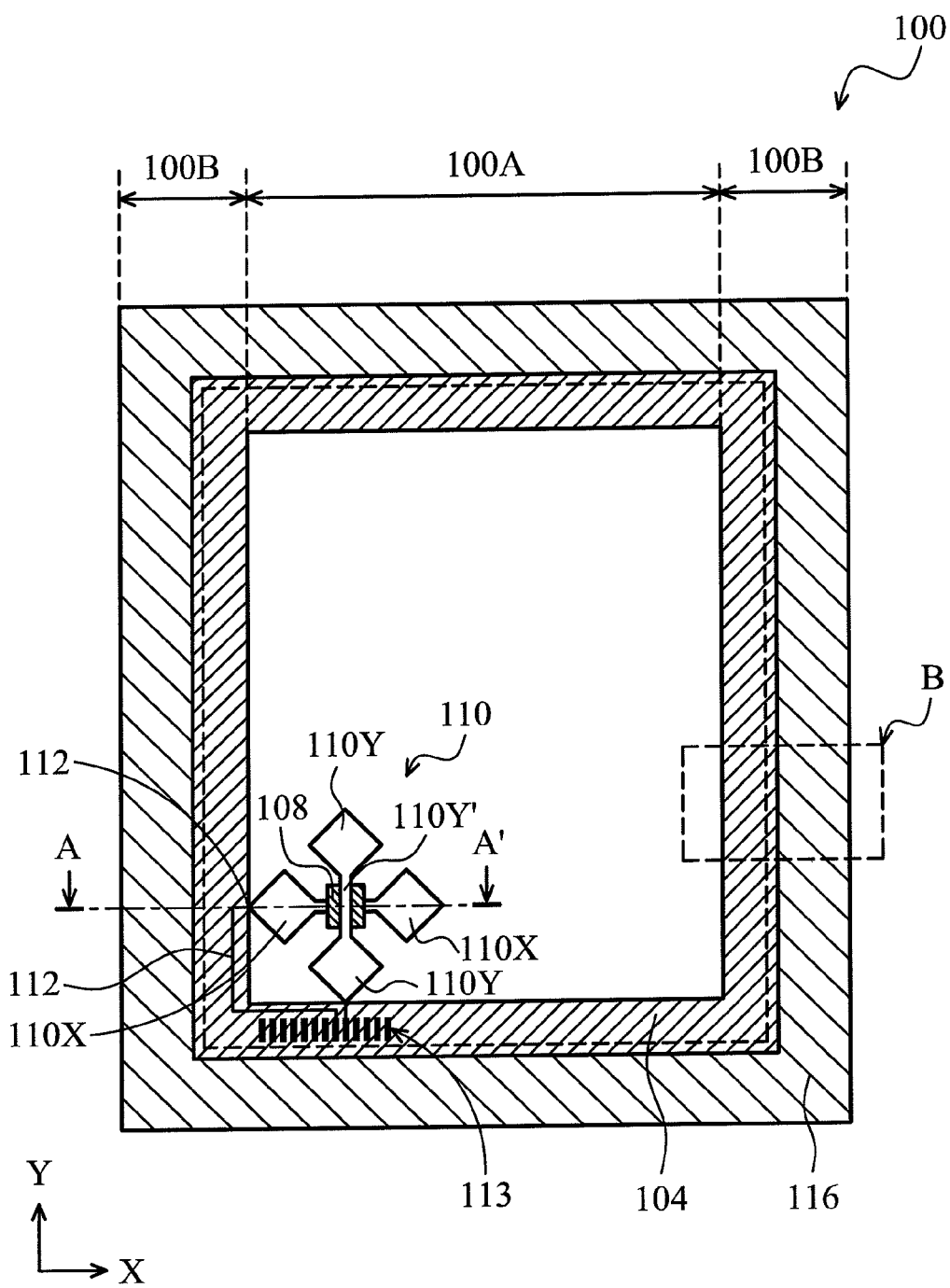
FIG. 1 shows an illustrative top view of a touch device according to an embodiment of the invention.

Referring to FIG. 1, a top view of a touch device 100 according to an embodiment of the invention is shown. A first light shielding pattern 104 and a second light shielding pattern 116 are disposed in a peripheral area 100B of the touch device 100. The first light shielding pattern 104 does not extend to the edges of a cover lens of the touch device 100. The second light shielding pattern 116 extends to the edges of the cover lens of the touch device 100. The second light shielding pattern 116 overlaps with at least a portion of the first light shielding pattern 104. In one embodiment, the first light shielding pattern 104 can be formed by an exposure and development process. The material of the first light shielding pattern 104 is for example a photo resist. The second light shielding pattern 116 can be formed by a printing process. The material of the second light shielding pattern 116 is for example a printing ink.

A touch sensing element 110 is disposed in a touch sensing area 100A surrounded by the peripheral area 100B of the touch device 100. In one embodiment, the touch sensing element 110 includes a plurality of touch sensing patterns 110X and 110Y. The touch sensing patterns 110X are arranged along a first direction for example an X-axis direction. The touch sensing patterns 110X are separated from each other to form a plurality of intermittent touch sensing lines along the X-axis direction. Further, the touch sensing patterns 110Y are arranged along a second direction perpendicular to the first direction, for example a Y-axis direction. The touch sensing patterns 110Y are connected with each other through a connecting portion 110Y' to form a plurality of continuous touch sensing lines along the Y-axis direction. The material of the touch sensing patterns 110X and 110Y may be a transparent conductive material, for example indium tin oxide (ITO).

An isolation structure 108 is disposed at the locations of the touch sensing lines formed of the touch sensing patterns 110X crossing the touch sensing lines formed of the touch sensing patterns 110Y for electrically isolating a bridge structure (not shown) of the touch sensing patterns 110X from the connecting portion 110Y' of the touch sensing patterns 110Y. This can prevent a short from occurring between the touch sensing lines of the Y-axis direction and the touch sensing lines of the X-axis direction. The material of the isolation structure 108 may be an organic or an inorganic insulating material. The inorganic insulating material is for example silicon oxide or silicon nitride. The organic insulating material is for example an acrylic-base photo resist. Moreover, the touch device 100 further includes a plurality of conductive traces 112. Touch sensing signals produced from the touch sensing patterns 110X and 110Y are delivered to bonding pads 113 of an external circuit through the conductive traces 112. The external circuit is for example a flexible printed circuit (FPC). The material of the conductive traces 112 may be metal.

Figure 2:
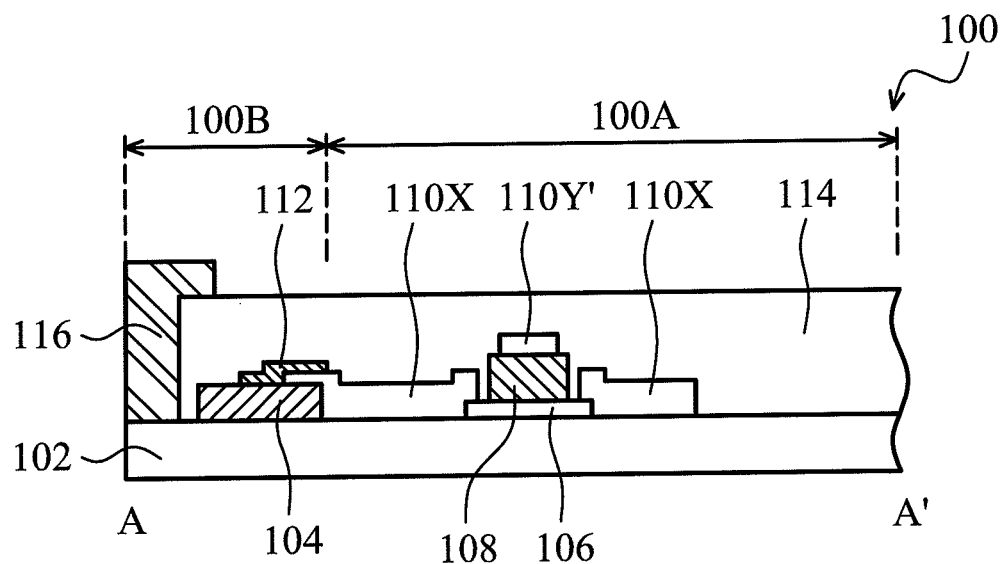
FIG. 2 shows an illustrative cross section of a portion of a touch device along the cross section line A-A' of FIG. 1 according to an embodiment of the invention.

Referring to FIG. 2, a cross section of a portion of the touch device 100 along the cross section line A-A' of FIG. 1 according to an embodiment of the invention is shown. The touch device 100 includes a cover lens 102. The first light shielding pattern 104 is formed on the cover lens 102 and disposed at the peripheral area 100B of the touch device 100. The first light shielding pattern 104 is disposed apart from an edge of the cover lens 102 and does not extend to the edge of the cover lens 102. The bridge structure 106 is formed at the touch sensing area 100A on the cover lens 102. Any two adjacent and separated touch sensing patterns 110X are electrically connected together by the bridge structure 106. The material of the bridge structure 106 may a transparent conductive material, for example ITO, or a metal material.

The isolation structure 108 is formed on the bridge structure 106. The touch sensing patterns 110X and 110Y are formed at the touch sensing area 100A on the cover lens 102, wherein the connecting portion 110Y' of the touch sensing patterns 110Y is formed on the isolation structure 108 and a portion of the touch sensing patterns 110X stretches over the first light shielding pattern 104. The conductive trace 112 is formed on the first light shielding pattern 104 and electrically connected with the touch sensing patterns 110X. In another embodiment, the isolation structure 108 can be disposed on the connecting portion 110Y' of the touch sensing patterns 110Y and the bridge structure 106 can be disposed on the isolation structure 108.

A passivation layer 114 is formed to completely cover the touch sensing patterns 110X and 110Y, the first light shielding pattern 104, the conductive trace 112, the bridge structure 106 and the isolation structure 108. Moreover, the passivation layer 114 also covers a side surface of the first light shielding pattern 104. The material of the passivation layer 114 may be an organic or an inorganic insulating material. The inorganic insulating material is such as silicon oxide or silicon nitride. The organic insulating material is such as an acrylic-base photo resist.

The second light shielding pattern 116 is formed on the passivation layer 114. The second light shielding pattern 116 is disposed at the peripheral area 100B of the touch device 100 and overlaps with a portion of the first light shielding pattern 104. Moreover, the second light shielding pattern 116 extends to align with the edge of the cover lens 102. Furthermore, the second light shielding pattern 116 is extending from the upper surface of the passivation layer 114 to cover the side surface of the passivation layer 114.

Figure 3:
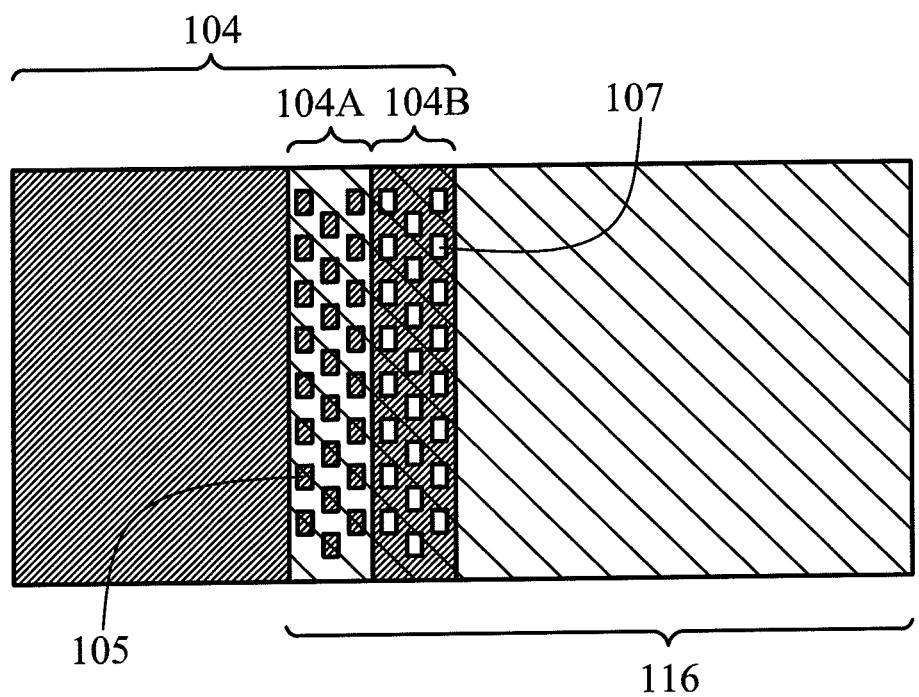
FIG. 3 shows an illustrative enlarged top view of a first and a second light shielding patterns as shown in the area B of FIG. 1 according to an embodiment of the invention.

Referring to FIG. 3, an enlarged top view of a portion of the first light shielding pattern 104 and the second light shielding pattern 116 as shown in the area B of FIG. 1 according to an embodiment of the invention is shown. The material of the first light shielding pattern 104 is a photo resist and the material of the second light shielding pattern 116 is a printing ink. Thus, a color difference between the first light shielding pattern 104 and the second light shielding pattern 116 is produced. In order to reduce the color difference between the first light shielding pattern 104 and the second light shielding pattern 116, in an embodiment, a peripheral portion of the first light shielding pattern 104 is designed to have a first mosaic pattern 104A and a second mosaic pattern 104B located at an area of the first light shielding pattern 104 overlapping with the second light shielding pattern 116. The first mosaic pattern 104A adjacent to the touch sensing area 100A has a full portion 105 and the second mosaic pattern 104B adjacent to the edges of the cover lens has a blank portion 107. The full portion 105 of the first mosaic pattern 104A is complementary to the blank portion 107 of the second mosaic pattern 104B in the patterns. The second light shielding pattern 116 covers the first mosaic pattern 104A and the second mosaic pattern 104B of the first light shielding pattern 104, thereby reducing the color difference between the first light shielding pattern 104 and the second light shielding pattern 116.

In another embodiment, there is no mosaic pattern existing at the area of the first light shielding pattern 104 overlapping with the second light shielding pattern 116. The touch device can display another appearance by the color difference between the first light shielding pattern 104 and the second light shielding pattern 116.

Figure 4A:
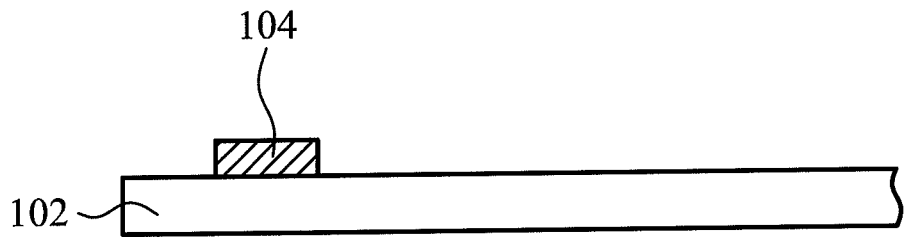
FIGS. 4A-4H show illustrative partial cross sections of several process stages of fabricating the touch device of FIG. 2 according to an embodiment of the invention.
Figure 4B:
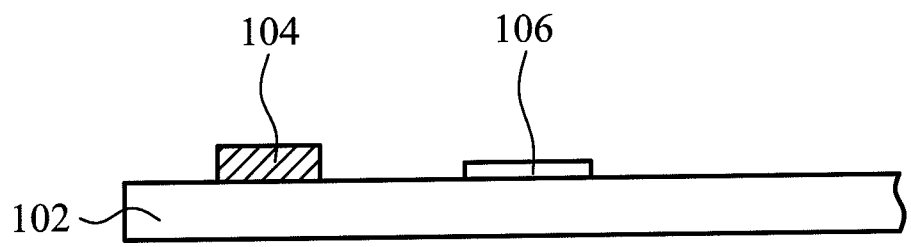
Figure 4C:
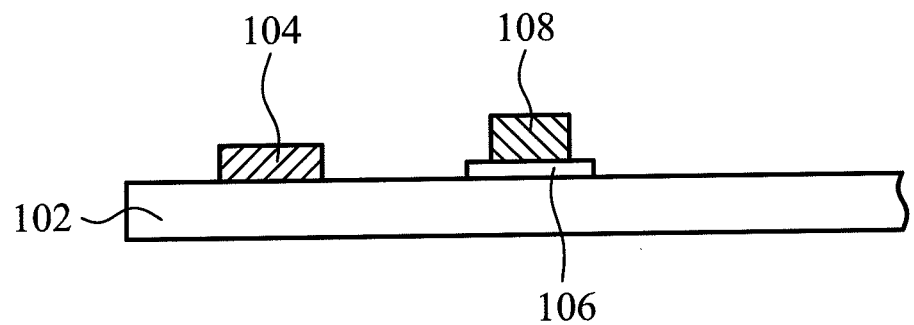

FIGS. 4A-4H show partial cross sections of several process stages of fabricating the touch device 100 of FIG. 2 according to an embodiment of the invention. Referring to FIG. 4B, firstly, a substrate used as the cover lens 102, for example a glass substrate, is provided. Then, the first light shielding pattern 104 is formed on the cover lens 102 by exposure and development processes. For example, a black photo resist is provided on the cover lens 102, and then the exposure process is performed on the black photo resist with a pattern of a photo mask. Next, the development process is performed on the black photo resist to form the first light shielding pattern 104. The first light shielding pattern 104 is formed at the peripheral area 100B of the touch device 100.

Referring to FIG. 4B, the bridge structure 106 is formed on the cover lens 102. In one embodiment, the material of the bridge structure 106 is ITO. Firstly, a first ITO layer is deposited on the cover lens 102. Then, photolithography and etching processes are performed on the first ITO layer to form the bridge structure 106. The bridge structure 106 is located at the touch sensing area 100A of the touch device 100. Next, referring to FIG. 4C, the isolation structure 108 is formed on the bridge structure 106. The material of the isolation structure 108 may be an organic or an inorganic insulating material. The inorganic insulating material is for example silicon oxide or silicon nitride. The organic insulating material is for example an acrylic-base photo resist. When the material of the isolation structure 108 is the acrylic-base photo resist, the isolation structure 108 can be formed by exposure and development processes.

Figure 4D:
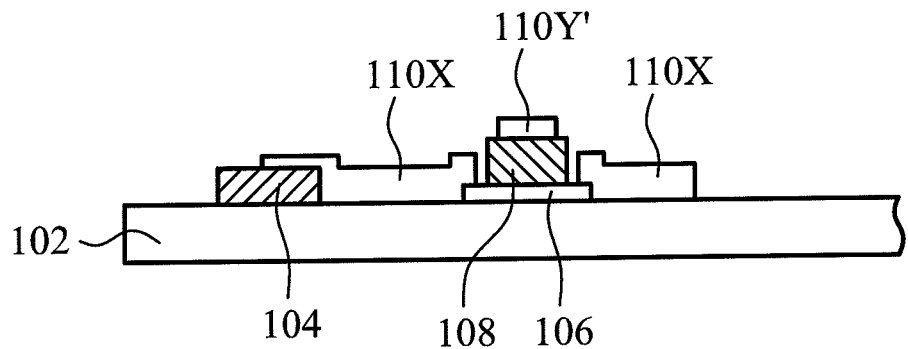

Referring to FIG. 4D, a second ITO layer is deposited on the cover lens 102, and then photolithography and etching processes are performed on the second ITO layer to form the touch sensing patterns 110X and 110Y. The connecting portion 110Y' of the touch sensing patterns 110Y is formed on the isolation structure 108. Any two adjacent touch sensing patterns 110X in the same row are electrically connected with each other through the bridge structure 106. A portion of the touch sensing patterns 110X stretches over the first light shielding pattern 104.

Figure 4E:
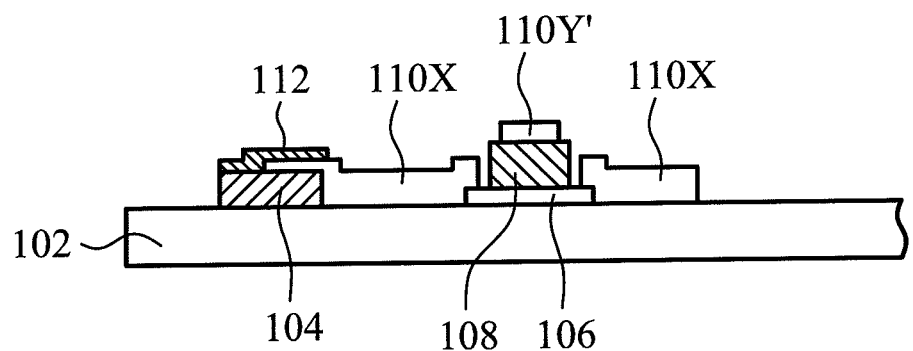

Referring to FIG. 4E, the conductive trace 112 is formed on the first light shielding pattern 104. A portion of the conductive trace 112 extends over the touch sensing pattern 110X. Thus, the conductive trace 112 is electrically connected with the touch sensing pattern 110X. The material of the conductive trace 112 may be metal. For example, a metal layer is deposited above the cover lens 102, and then photolithography and etching processes are performed on the metal layer to form the conductive trace 112.

Figure 4F:
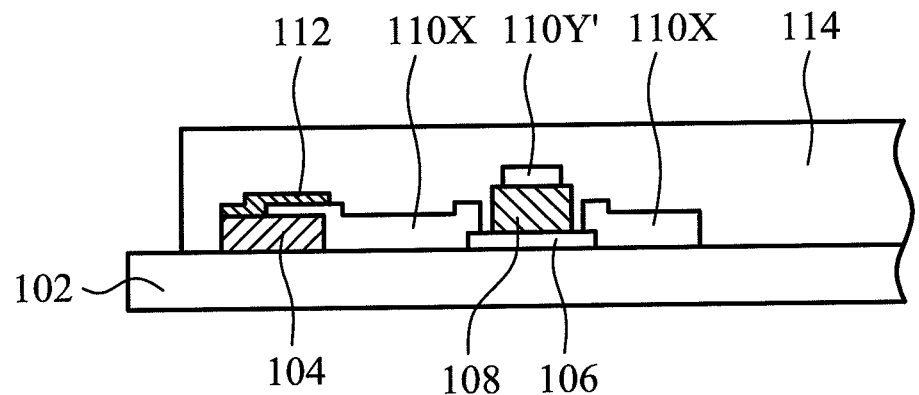

Referring to FIG. 4F, the passivation layer 114 may be formed above the cover lens 102 by exposure and development processes. The passivation layer 114 completely covers the touch sensing patterns 110X and 110Y, the first light shielding pattern 104, the conductive trace 112, the bridge structure 106 and the isolation structure 108.

Figure 4G:
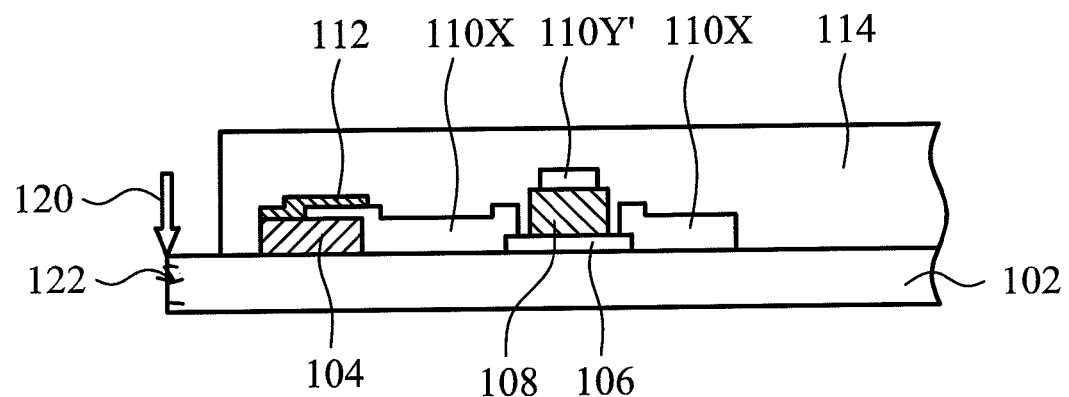

Referring to FIG. 4G, after forming the passivation layer 114, the glass substrate used for the cover lens 102 is cut by a cutting process 120. After the cutting process 120, cracks 122 may be produced on the edges of the glass substrate.

Figure 4H:
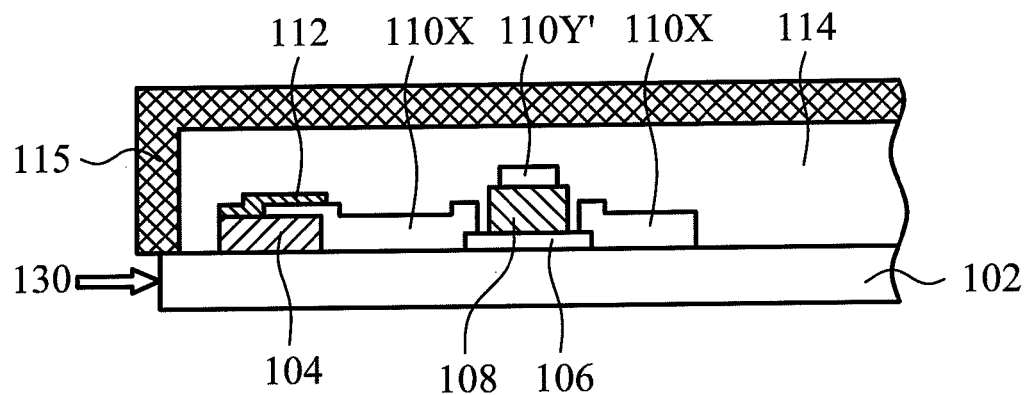

Referring to FIG. 4H, in order to eliminate the cracks 122 on the edges of the glass substrate to enhance the strength of the cover lens 102, an etching process 130 is performed on the edges of the glass substrate with hydrofluoric acid (HF). Before performing the etching process 130, a protective film 115 is provided on the upper surface of the side surfaces of the passivation layer 114. This can prevent all elements on the cover lens 102 from damage during the etching process 130. The material of the protective film 115 is for example a stripable coating.

In the embodiments of the invention, after cutting the glass substrate, the first light shielding pattern 104 does not extend to the edges of the glass substrate. Therefore, during the process of etching the edges of the glass substrate, the first light shielding pattern 104 is not damaged by the etching process. In addition, because the first light shielding pattern 104 does not extend to the edges of the glass substrate, the protective film 115 can be attached on the side surface of the passivation layer 114 and does not contact the first light shielding pattern 104. According to the embodiments of the invention, during the etching process 130, the protective film 115 can effectively protect the elements of the touch device 100.

Next, the protective film 115 is removed. Then, the second light shielding pattern 116 is formed on the passivation layer 114 by a printing process to complete the touch device 100 of FIG. 2. Meanwhile, the second light shielding pattern 116 further covers the side surfaces of the passivation layer 114. In one embodiment, the second light shielding pattern 116 overlaps with a portion of the first light shielding pattern 104. In another embodiment, the second light shielding pattern 116 may completely cover the first light shielding pattern 104, but does not cover the touch sensing area 100A of the touch device 100. In addition, while the second light shielding pattern 116 is formed by a printing process, a trademark (not shown) also can be formed on the touch device 100 by the printing process.

In the conventional touch devices, a light shielding pattern is formed by exposure and development processes. When the pattern design of the light shielding pattern is changed, the photo mask used for forming the light shielding pattern also requires replacement. However, according to the embodiments of the invention, when the pattern design of the light shielding pattern is changed, the photo mask used for forming the first light shielding pattern does not require replacement. The only requirement is to change the printing pattern of the second light shielding pattern to achieve the new pattern design of the light shielding pattern. Therefore, compared with conventional touch devices, the embodiments of the invention can reduce the fabrication cost of the touch devices.

Moreover, in the conventional touch devices, after cutting the glass substrate used for the cover lens, the light shielding pattern is aligned with the edges of the glass substrate. Thus, during the process of etching the edges of the glass substrate, it is easy for the light shielding pattern of the conventional touch device to be damaged. However, according to the embodiments of the invention, after cutting the glass substrate used for the cover lens, the first light shielding pattern is disposed apart from the edges of the glass substrate. Thus, during the process of etching the edges of the glass substrate, the first light shielding pattern of the embodiments of the invention is not damaged. Therefore, compared with conventional touch devices, the embodiments of the invention can enhance the fabrication yield of the touch devices.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch device, comprising:
a cover lens;
a first light shielding pattern disposed on the cover lens;
a touch sensing element disposed on the cover lens;
a passivation layer disposed over the touch sensing element and the first light shielding pattern; and
a second light shielding pattern disposed on the passivation layer and overlapping a portion of the first light shielding pattern, wherein the portion of the first light shielding pattern overlapping with the second light shielding pattern comprises a first mosaic pattern and a second mosaic pattern.

2. The touch device of claim 1, wherein the material of the first light shielding pattern comprises a photo resist.

3. The touch device of claim 1, wherein the material of the second light shielding pattern comprises a printing ink.

4. The touch device of claim 1, wherein the passivation layer covers a side surface of the first light shielding pattern.

5. The touch device of claim 1, wherein the first mosaic pattern has a full portion.

6. The touch device of claim 1, wherein the second mosaic pattern has a blank portion.

7. The touch device of claim 1, wherein the touch sensing element comprises a plurality of first touch sensing patterns arranged along a first direction, wherein the first touch sensing patterns are separated from each other.

8. The touch device of claim 7, wherein the touch sensing element further comprises a bridge structure disposed between any two adjacent first touch sensing patterns.

9. The touch device of claim 7, wherein the touch sensing element further comprises a plurality of second touch sensing patterns arranged along a second direction perpendicular to the first direction, wherein the second touch sensing patterns are connected with each other.

10. The touch device of claim 9, wherein the touch sensing element further comprises an isolation structure disposed above or under a connecting part of any two adjacent second touch sensing patterns.

11. The touch device of claim 7, further comprising a plurality of conductive traces disposed on the first light shielding pattern.

12. A method of fabricating a touch device, comprising:
providing a substrate;
forming a first light shielding pattern on the substrate;
forming a touch sensing element on the substrate;
forming a passivation layer to cover the touch sensing element and the first light shielding pattern;
cutting the substrate;
providing a protective film on an upper surface and a side surface of the passivation layer;
etching an edge of the cut substrate; and
forming a second light shielding pattern on the passivation layer and to overlap a portion of the first light shielding pattern.

13. The method of claim 12, wherein the step of forming the first light shielding pattern comprises:
providing a black photo resist on the substrate; and
performing exposure and development processes on the black photo resist.

14. The method of claim 12, wherein the step of forming the touch sensing element comprises:
depositing a first transparent conductive material layer on the substrate;
performing photolithography and etching processes on the first transparent conductive material layer to form a bridge structure;
forming an isolation structure on the bridge structure;
depositing a second transparent conductive material layer on the substrate; and
performing photolithography and etching processes on the second transparent conductive material layer to form a plurality of first touch sensing patterns arranged along a first direction and a plurality of second touch sensing patterns arranged along a second direction perpendicular to the first direction, wherein the first touch sensing patterns are separated from each other and the second touch sensing patterns are connected with each other.

15. The method of claim 14, wherein any two adjacent first touch sensing patterns are electrically connected together by the bridge structure and a connecting part of any two adjacent second touch sensing patterns is formed on the isolation structure.

16. The method of claim 14, further comprising:
depositing a metal layer on the first light shielding pattern; and
performing photolithography and etching processes on the metal layer to form a plurality of conductive traces on the first light shielding pattern.

17. The method of claim 12, further comprising:
removing the protective film; and
printing the second light shielding pattern on the passivation layer.

18. The touch device of claim 1, wherein the second light shielding pattern covers a side surface of the passivation layer.

* * * * *